(12) United States Patent
Ripley et al.

(10) Patent No.: US 8,122,993 B2
(45) Date of Patent: Feb. 28, 2012

(54) POWER STEERING FOR AN ALL TERRAIN VEHICLE

(75) Inventors: Richard D Ripley, Rush City, MN (US); Eric P Nault, Dresser, MN (US); Scott D Taylor, Blaine, MN (US)

(73) Assignee: Polaris Industries Inc., Medina, MN (US)

( * ) Notice: Subject to any disclaimer, the term of this patent is extended or adjusted under 35 U.S.C. 154(b) by 588 days.

(21) Appl. No.: 12/228,597

(22) Filed: Aug. 14, 2008

(65) Prior Publication Data

US 2009/0308682 A1 Dec. 17, 2009

Related U.S. Application Data

(60) Provisional application No. 61/131,664, filed on Jun. 11, 2008.

(51) Int. Cl.
*B60K 17/34* (2006.01)

(52) U.S. Cl. .......................... 180/233; 180/245; 180/444

(58) Field of Classification Search .................. 180/444, 180/443, 908, 233, 245
See application file for complete search history.

(56) References Cited

U.S. PATENT DOCUMENTS

| | | | |
|---|---|---|---|
| 610,132 A | 8/1898 | Goodridge | |
| 2,553,795 A | 5/1951 | Staude | |
| 4,577,716 A | 3/1986 | Norton | |
| 4,686,433 A | 8/1987 | Shimizu | |
| 5,010,970 A | 4/1991 | Yamamoto | |
| 5,020,616 A | 6/1991 | Yagi et al. | |
| 5,021,721 A | 6/1991 | Oshita et al. | |
| 5,027,915 A | 7/1991 | Suzuki et al. | |
| 5,078,225 A | 1/1992 | Ohmura et al. | |
| 5,205,371 A | 4/1993 | Karnopp | |
| 5,253,730 A | 10/1993 | Hayashi et al. | |
| 5,887,671 A | 3/1999 | Yuki et al. | |
| 6,966,399 B2 | 11/2005 | Tanigaki et al. | |
| 7,077,233 B2 | 7/2006 | Hasegawa | |
| 7,096,988 B2 | 8/2006 | Moriyama | |
| 7,182,169 B2 | 2/2007 | Suzuki | |
| 7,185,732 B2 | 3/2007 | Saito et al. | |
| 7,216,733 B2 | 5/2007 | Iwami et al. | |
| 7,370,724 B2 | 5/2008 | Saito et al. | |
| 7,374,012 B2 | 5/2008 | Inui et al. | |
| 7,380,622 B2 | 6/2008 | Shimizu | |
| 7,458,593 B2 | 12/2008 | Saito et al. | |
| 7,481,293 B2 | 1/2009 | Ogawa et al. | |
| 7,497,299 B2 | 3/2009 | Kobayashi | |
| 7,497,471 B2 | 3/2009 | Kobayashi | |
| 7,540,511 B2 | 6/2009 | Saito et al. | |
| 7,565,944 B2 | 7/2009 | Sakamoto et al. | |
| 7,565,945 B2 | 7/2009 | Okada et al. | |
| 7,600,603 B2 | 10/2009 | Okada et al. | |
| 7,604,084 B2 | 10/2009 | Okada et al. | |

(Continued)

FOREIGN PATENT DOCUMENTS

JP 2005-193788 7/2005

(Continued)

*Primary Examiner* — Anne Marie Boehler
*Assistant Examiner* — Maurice Williams
(74) *Attorney, Agent, or Firm* — Faegre Baker Daniels LLP (57) ABSTRACT

An all-terrain vehicle including a frame having longitudinally-spaced ends defining a first longitudinal axis, and a power steering unit supported by the frame. The power steering unit has an output shaft which is held at its free end in an aperture, and rotates within a bearing.

16 Claims, 13 Drawing Sheets

U.S. PATENT DOCUMENTS

| | | | |
|---|---|---|---|
| 7,610,132 B2 | 10/2009 | Yanai et al. | |
| 7,623,327 B2 | 11/2009 | Ogawa | |
| 7,753,162 B2 * | 7/2010 | Shiozawa et al. | 180/446 |
| 7,775,318 B2 * | 8/2010 | Okada et al. | 180/444 |
| 7,900,743 B2 * | 3/2011 | Kaku et al. | 180/444 |
| 2004/0099470 A1 * | 5/2004 | Tanigaki et al. | 180/443 |
| 2004/0153782 A1 | 8/2004 | Fukui et al. | |
| 2004/0216945 A1 * | 11/2004 | Inui | 180/400 |
| 2004/0221669 A1 | 11/2004 | Shimizu et al. | |
| 2004/0226384 A1 | 11/2004 | Shimizu et al. | |
| 2005/0012421 A1 | 1/2005 | Fukuda et al. | |
| 2005/0045414 A1 | 3/2005 | Takagi et al. | |
| 2005/0231145 A1 | 10/2005 | Mukai et al. | |
| 2005/0235767 A1 | 10/2005 | Shimizu et al. | |
| 2005/0235768 A1 | 10/2005 | Shimizu et al. | |
| 2005/0242677 A1 | 11/2005 | Akutsu et al. | |
| 2005/0257989 A1 * | 11/2005 | Iwami et al. | 180/443 |
| 2005/0257990 A1 | 11/2005 | Shimizu | |
| 2005/0267660 A1 | 12/2005 | Fujiwara et al. | |
| 2006/0022619 A1 | 2/2006 | Koike et al. | |
| 2006/0042862 A1 | 3/2006 | Saito et al. | |
| 2006/0055139 A1 | 3/2006 | Furumi et al. | |
| 2006/0065472 A1 | 3/2006 | Ogawa et al. | |
| 2006/0075840 A1 | 4/2006 | Saito et al. | |
| 2006/0076180 A1 | 4/2006 | Saito et al. | |
| 2006/0108174 A1 | 5/2006 | Saito et al. | |
| 2006/0162990 A1 | 7/2006 | Saito et al. | |
| 2006/0169525 A1 | 8/2006 | Saito et al. | |
| 2006/0175124 A1 | 8/2006 | Saito et al. | |
| 2006/0180385 A1 | 8/2006 | Yanai et al. | |
| 2006/0185741 A1 | 8/2006 | McKee et al. | |
| 2006/0185927 A1 | 8/2006 | Sakamoto et al. | |
| 2006/0191734 A1 | 8/2006 | Kobayashi | |
| 2006/0191735 A1 | 8/2006 | Kobayashi | |
| 2006/0191737 A1 | 8/2006 | Kobayashi et al. | |
| 2006/0191739 A1 | 8/2006 | Koga | |
| 2006/0196721 A1 | 9/2006 | Saito et al. | |
| 2006/0196722 A1 | 9/2006 | Makabe et al. | |
| 2006/0201270 A1 | 9/2006 | Kobayashi et al. | |
| 2006/0207823 A1 | 9/2006 | Okada et al. | |
| 2006/0207824 A1 | 9/2006 | Saito et al. | |
| 2006/0207825 A1 | 9/2006 | Okada et al. | |
| 2006/0208564 A1 | 9/2006 | Yuda et al. | |
| 2006/0212200 A1 | 9/2006 | Yanai et al. | |
| 2006/0219452 A1 | 10/2006 | Okada et al. | |
| 2006/0219469 A1 | 10/2006 | Okada et al. | |
| 2006/0219470 A1 | 10/2006 | Imagawa et al. | |
| 2006/0288800 A1 | 12/2006 | Mukai et al. | |
| 2007/0068726 A1 | 3/2007 | Shimizu | |
| 2007/0074588 A1 | 4/2007 | Harata et al. | |
| 2007/0074589 A1 | 4/2007 | Harata et al. | |
| 2007/0074927 A1 | 4/2007 | Okada et al. | |
| 2007/0074928 A1 | 4/2007 | Okada et al. | |
| 2007/0087890 A1 * | 4/2007 | Hamrin et al. | 475/249 |
| 2007/0095601 A1 * | 5/2007 | Okada et al. | 180/444 |
| 2007/0096449 A1 | 5/2007 | Okada et al. | |
| 2007/0175696 A1 | 8/2007 | Saito et al. | |
| 2007/0242398 A1 | 10/2007 | Ogawa | |
| 2008/0053743 A1 | 3/2008 | Tomita | |
| 2008/0199253 A1 | 8/2008 | Okada et al. | |
| 2008/0257630 A1 | 10/2008 | Takeshima et al. | |
| 2009/0078491 A1 | 3/2009 | Tsutsumikoshi et al. | |
| 2009/0078492 A1 | 3/2009 | Tsutsumikoshi et al. | |
| 2009/0152035 A1 | 6/2009 | Okada et al. | |
| 2009/0152036 A1 | 6/2009 | Okada et al. | |

FOREIGN PATENT DOCUMENTS

| | | |
|---|---|---|
| JP | 2006-232058 | 9/2006 |
| JP | 2006-232061 | 9/2006 |
| JP | 2006-256579 | 9/2006 |
| JP | 2006-256580 | 9/2006 |
| JP | 2006-281839 | 10/2006 |
| JP | 2007-106319 | 4/2007 |
| WO | WO 2009/096998 A1 | 8/2009 |

* cited by examiner

FIG. 13

POWER STEERING FOR AN ALL TERRAIN VEHICLE

CROSS REFERENCE TO RELATED APPLICATION

This application is related to U.S. Provisional Patent Application Ser. No. 60/930,361, filed May 16, 2007, and Utility patent application Ser. Nos. 12/069,511, 12/069,515, and 12/069,521, all of which were filed on Feb. 11, 2008 and all of which are expressly incorporated herein by reference.

FIELD OF THE INVENTION

The present disclosure relates to all-terrain vehicle (ATVs) having a power steering assembly. Specifically, the present disclosure relates to ATVs having a power steering assembly operatively connected to the steering shaft of the vehicle.

BACKGROUND OF THE INVENTION

Generally, all terrain vehicles ("ATVs") and utility vehicles ("UVs") are used to carry one or two passengers and a small amount of cargo over a variety of terrains. Due to increasing recreational interest in ATVs, it is desirable to provide the ATVs with power steering or a power assist steering. Some versions of the steering already exist, see for example U.S. Pat. Nos. 6,966,399 and 7,077,233; and U.S. Patent Application Publication No. 2006/0212200.

The above mentioned and other features of this invention, and the manner of attaining them, will become more apparent and the invention itself will be better understood by reference to the following description of embodiments of the invention taken in conjunction with the accompanying drawings.

SUMMARY OF THE INVENTION

In one embodiment, an all-terrain vehicle comprises a frame including longitudinally spaced-apart ends defining a first longitudinal axis, the frame comprising a frame front end portion; a plurality of wheels operably coupled to the frame; a steering linkage operatively coupled between an operator input steering portion and at least of the plurality of wheels; and a power steering assembly operatively coupled to the steering linkage. The power steering assembly comprises an electric motor and a gear box, the gear box comprising an input shaft and an output shaft, the input shaft being operatively coupled to the operator input steering portion and the output shaft being operatively coupled to the steering linkage. The output shaft is supported both vertically and laterally by a support assembly.

In another embodiment of the invention, an all-terrain vehicle comprises a frame comprising longitudinally spaced-apart ends defining a first longitudinal axis, the frame comprising a frame front end portion; a plurality of wheels operably coupled to the frame; a steering linkage operatively coupled between an operator input steering portion and at least of the plurality of wheels; a power steering assembly operatively coupled to the steering linkage, the power steering assembly comprising an electric motor and a gear box, the gear box comprising an input shaft and an output shaft, the input shaft being operatively coupled to the operator input steering portion, and the output shaft being operatively coupled to the steering linkage, and having a bearing adjacent its free end. A bearing support flange is attached to the frame and supports the output shaft bearing.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to an all terrain vehicle, it should be understood that the invention may have application to other types of vehicles, such as snowmobiles, motorcycles, watercraft, utility vehicles, scooters, golf carts, and mopeds.

Referring initially to FIGS. 1-4, one illustrative embodiment of an all terrain vehicle (ATV) 10 is shown. ATV 10 includes front end 11 supported by front wheels 12 and tires 14, and rear end 13 is supported by rear wheels 16 and tires 18. ATV 10 further includes a straddle-type seat 20, rear panel 22 which may include a tool storage compartment or rear rack, front panel 24 which may include a tool storage compartment or front rack and handlebar assembly 26. Front end 11 and rear end 13 are separated by footwells 28 on both lateral sides of ATV 10 and separated by seat 20. Front end 11 is also supported by front suspension 30. Handlebar assembly 26 is operably coupled to front wheels 12 to allow a rider to steer ATV 10 when supported by seat 20 and/or footwells 28. Front panel 24 and rear panel 22 may also include an accessory coupling system such as the one disclosed in U.S. Pat. No. 7,055,454, the disclosure of which is expressly incorporated by reference herein.

Figure 1:
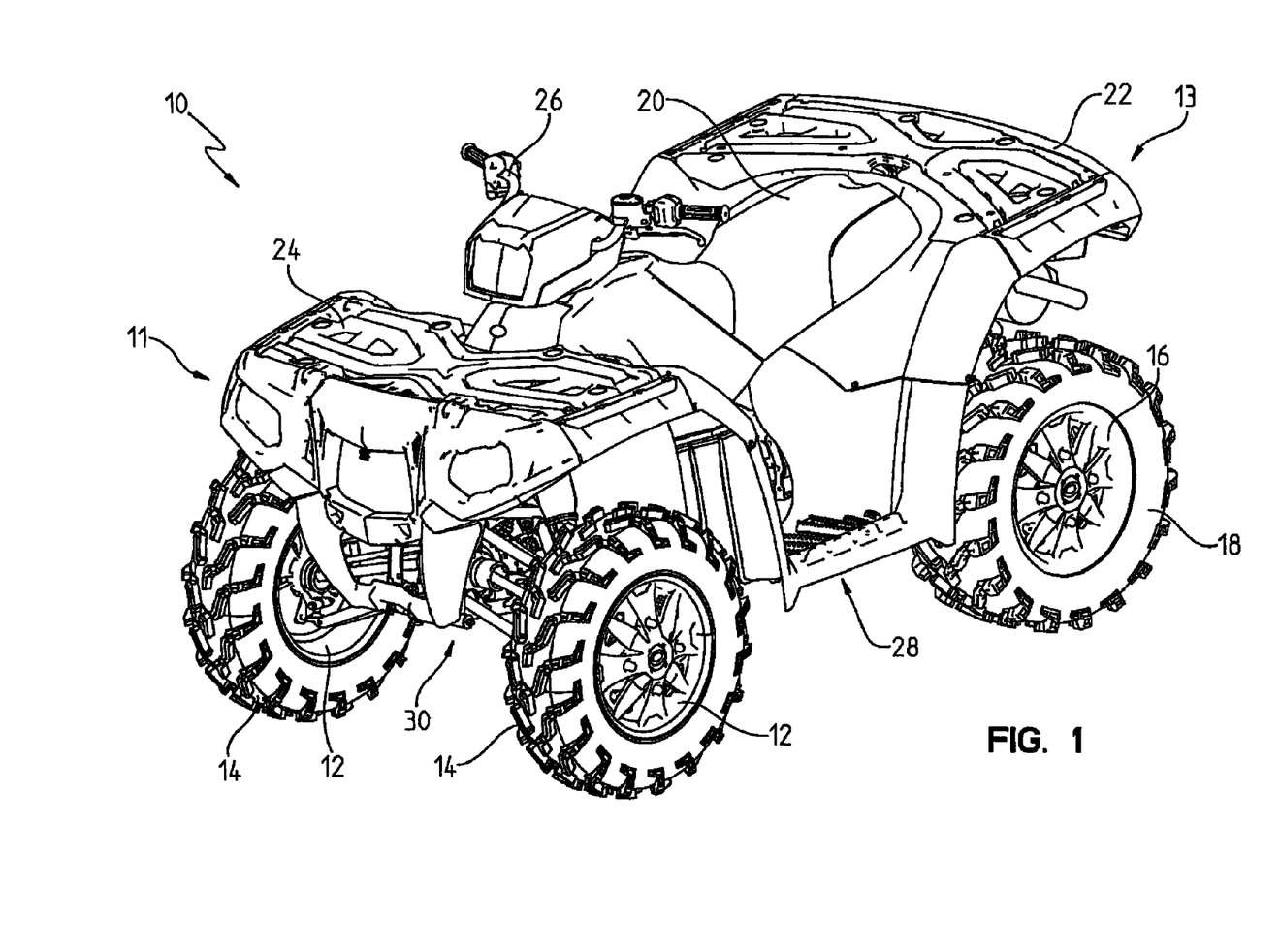
FIG. 1 is a perspective view of an ATV in accordance with illustrative embodiments of the present invention.
Figure 2:
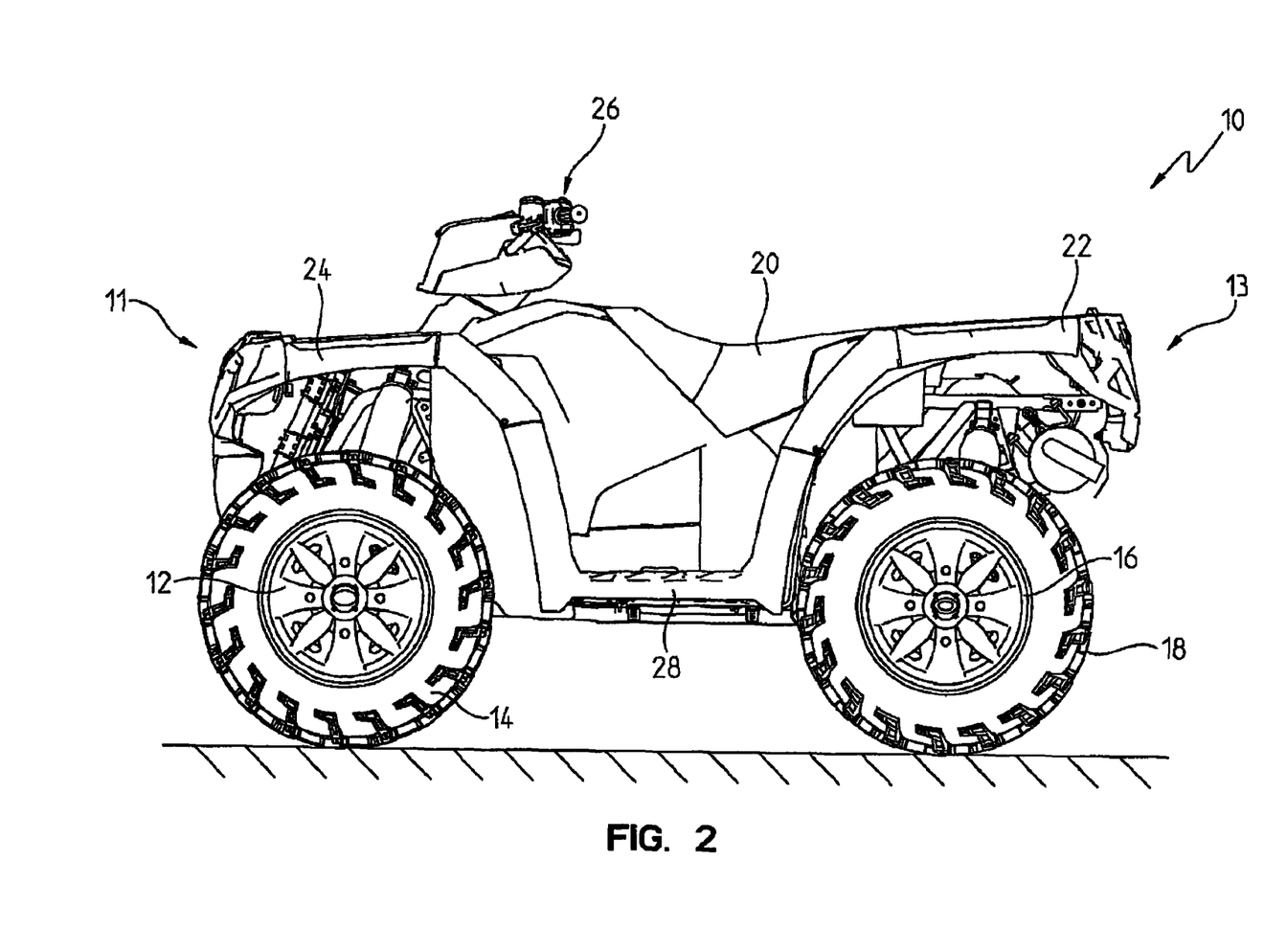
FIG. 2 is a left side view of the ATV shown in FIG. 1.
Figure 3:
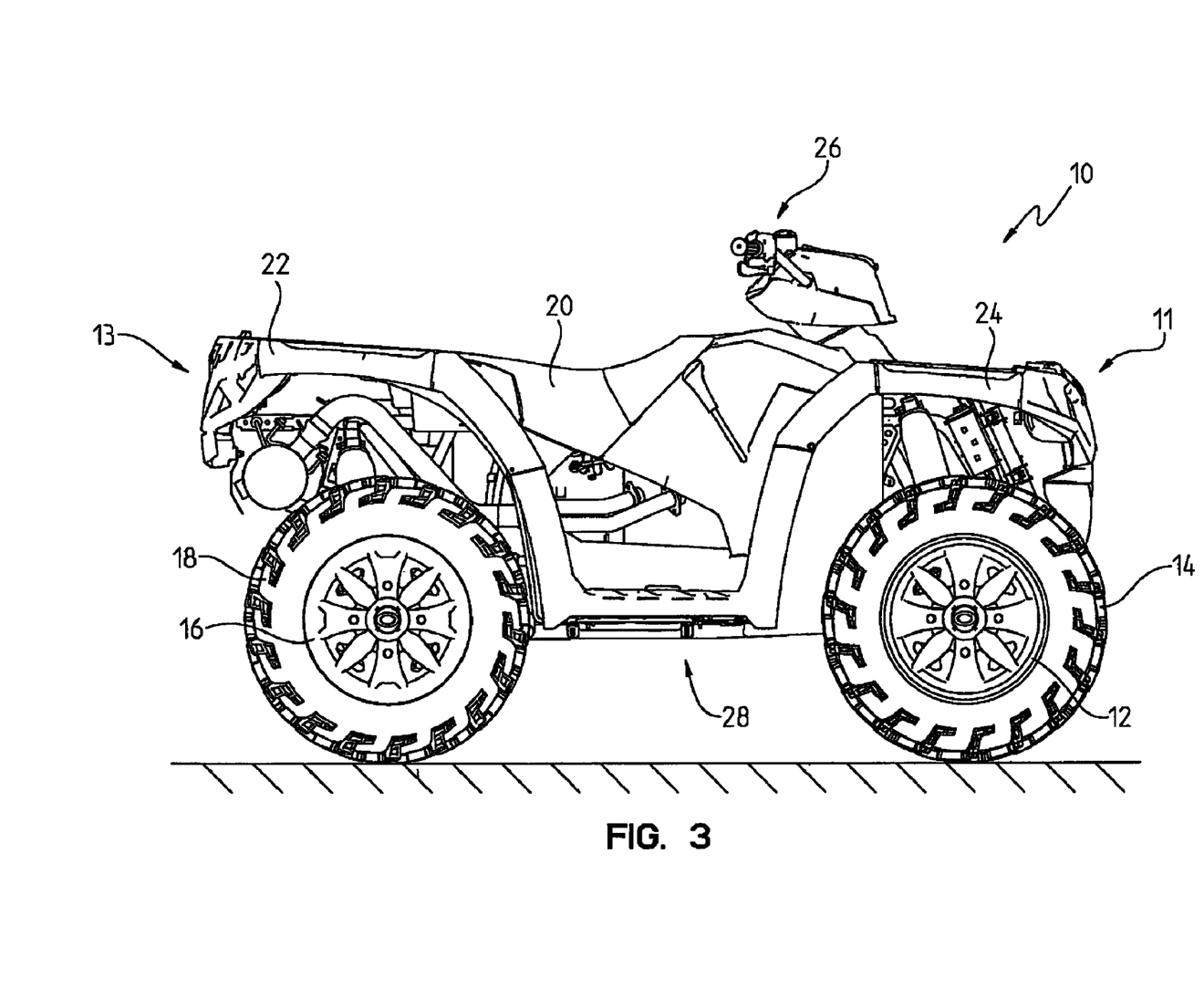
FIG. 3 is a right side view of the ATV shown in FIG. 1.
Figure 4:
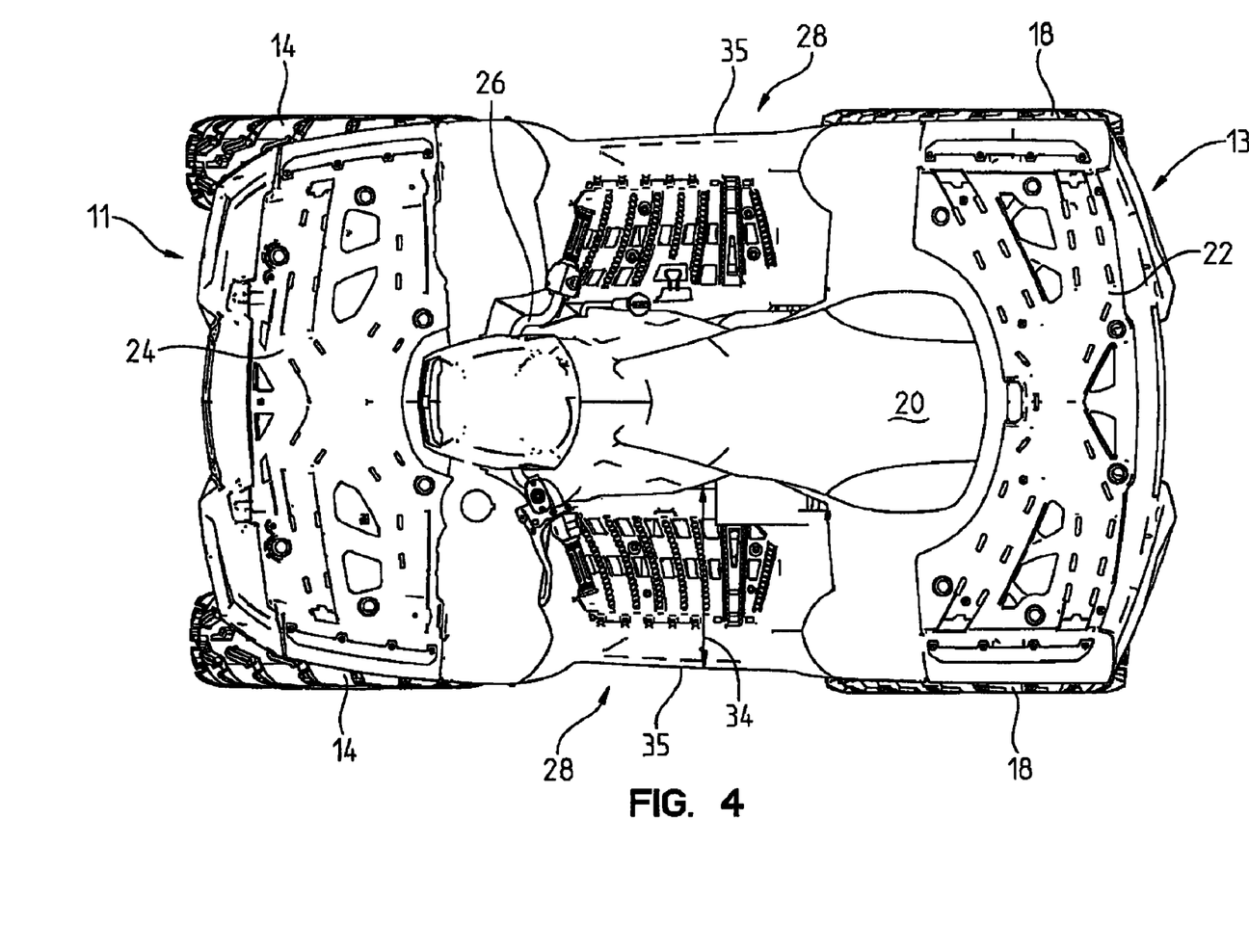
FIG. 4 is a top plan view of the ATV shown in FIG. 1.
Figure 5:
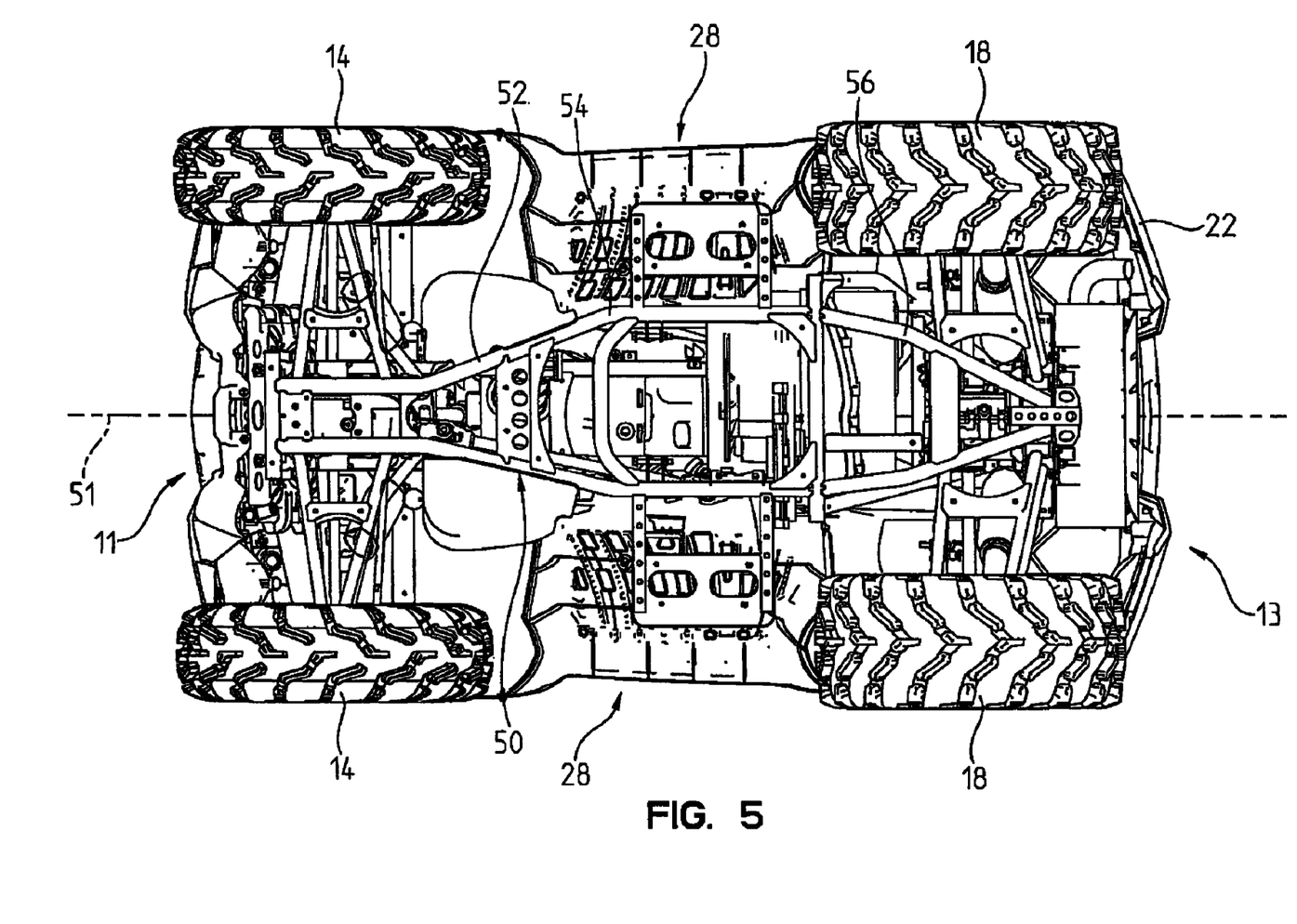
FIG. 5 is a bottom plan view of the ATV shown in FIG. 1.
Figure 6:
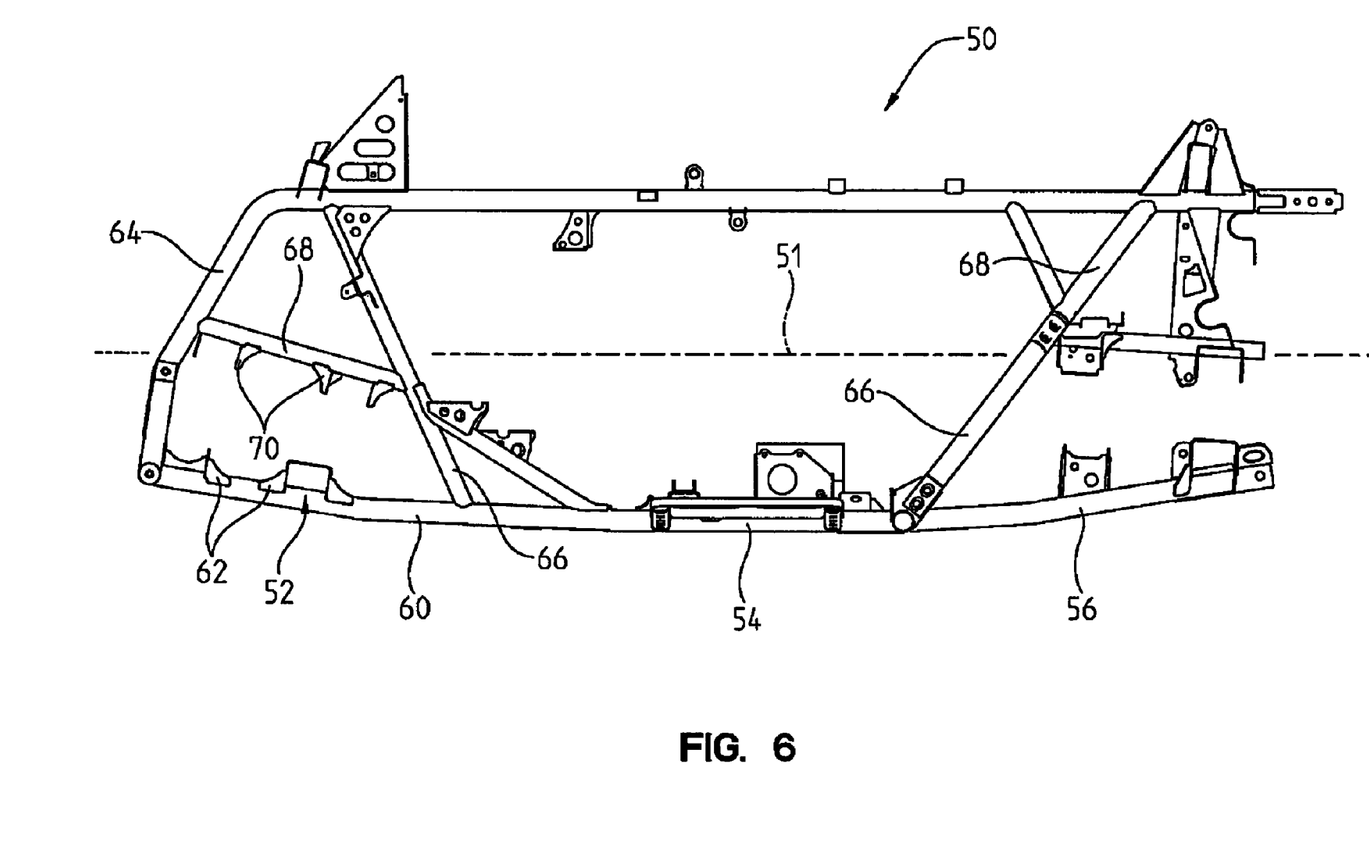
FIG. 6 is a side view of the frame of the ATV shown in FIG. 1.
Figure 7:
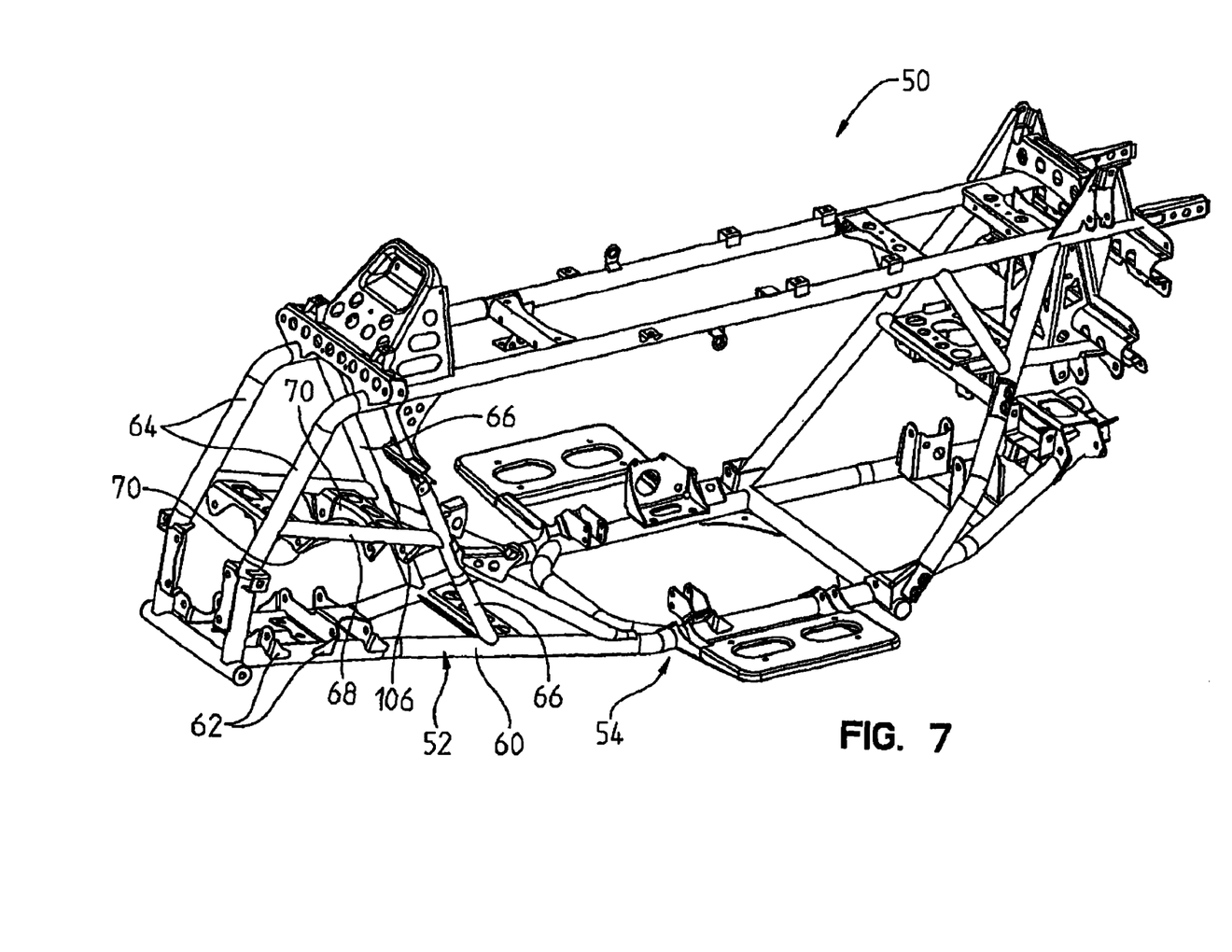
FIG. 7 is another perspective view of the frame of the ATV shown in FIG. 1.

Referring now to FIGS. 5-7, ATV 10 includes frame 50 defining a longitudinal axis 51 (FIGS. 5 and 6) and which includes front portion 52, middle portion 54, and rear portion 56. As shown in FIG. 6, front portion 52 and rear portion 52 of frame 50 are angled upwardly to provide additional ground clearance to front end 11 and rear end 13 of ATV 10. As shown in FIGS. 6 and 7, front portion 52 includes lower frame tubes 60 having brackets 62 for mounting the front differential thereto. Front portion 52 further includes two pair of upstanding tube pairs 64 and 66, connector tubes 68, having cross brackets 70 mounted between cross tubes 68.

Figure 8:
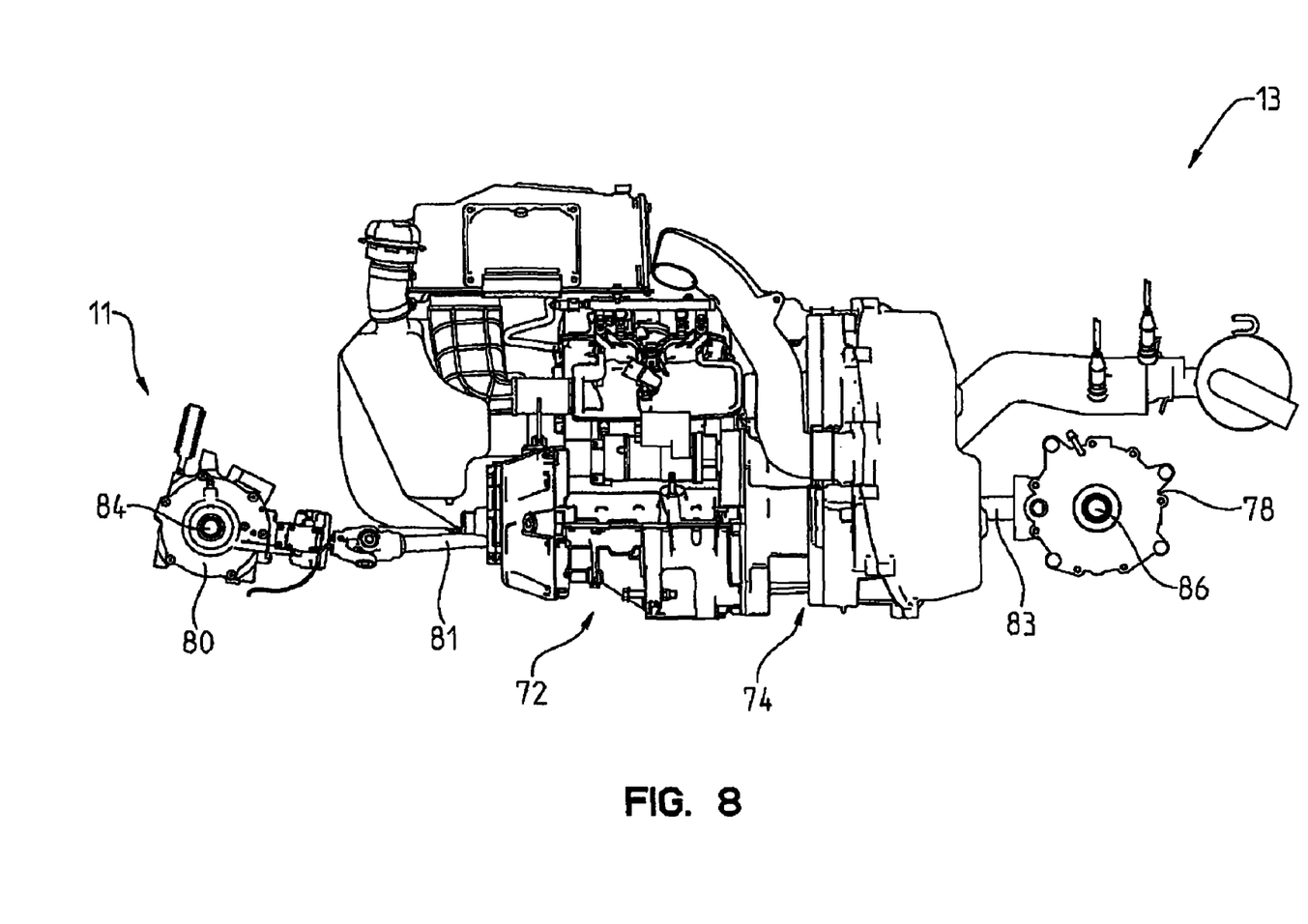
FIG. 8 is a right side view of an engine and transmission that may be used in an ATV such as the one shown in FIG. 1.
Figure 9:
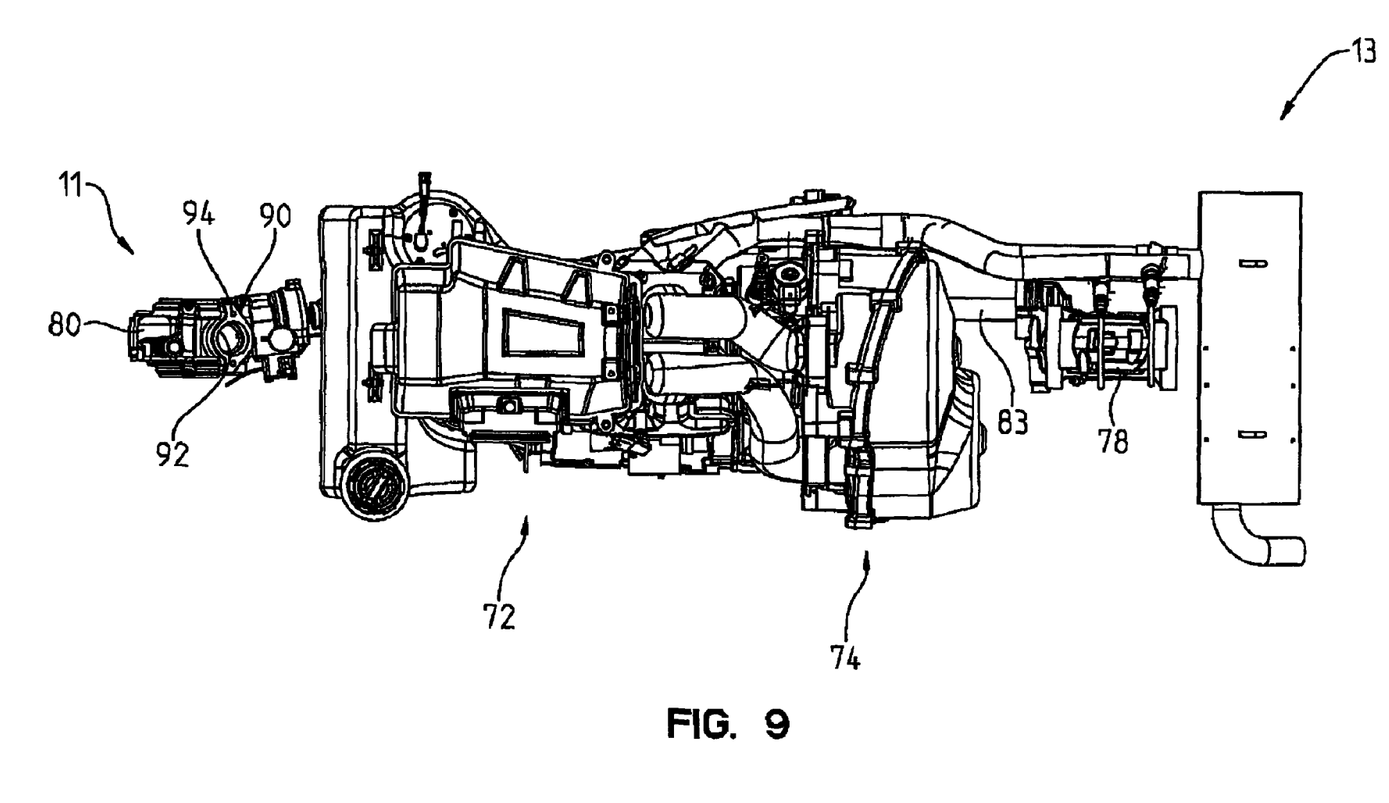
FIG. 9 is a top view of an engine and transmission of FIG. 8.

FIGS. 8 and 9 are an illustrative side and top views of engine 72 and transmission 74 of ATV 10, respectively. Engine 72 is positioned adjacent front end 11 of ATV 10. Transmission 74 is illustratively coupled directly to engine 72 in the manner detailed herein. Transmission 74 provides power to front differential 80 through front transmission shaft 81 and to rear differential 78 through rear transmission shaft 83. Front differential 80 powers front axle 84, whereas rear differential 78 powers rear axle 86. As best shown in FIG. 9, differential 80 includes a mounting flange 90 having an internal bore 92 and mounting holes 94, which will be described in greater detail herein.

Figure 10:
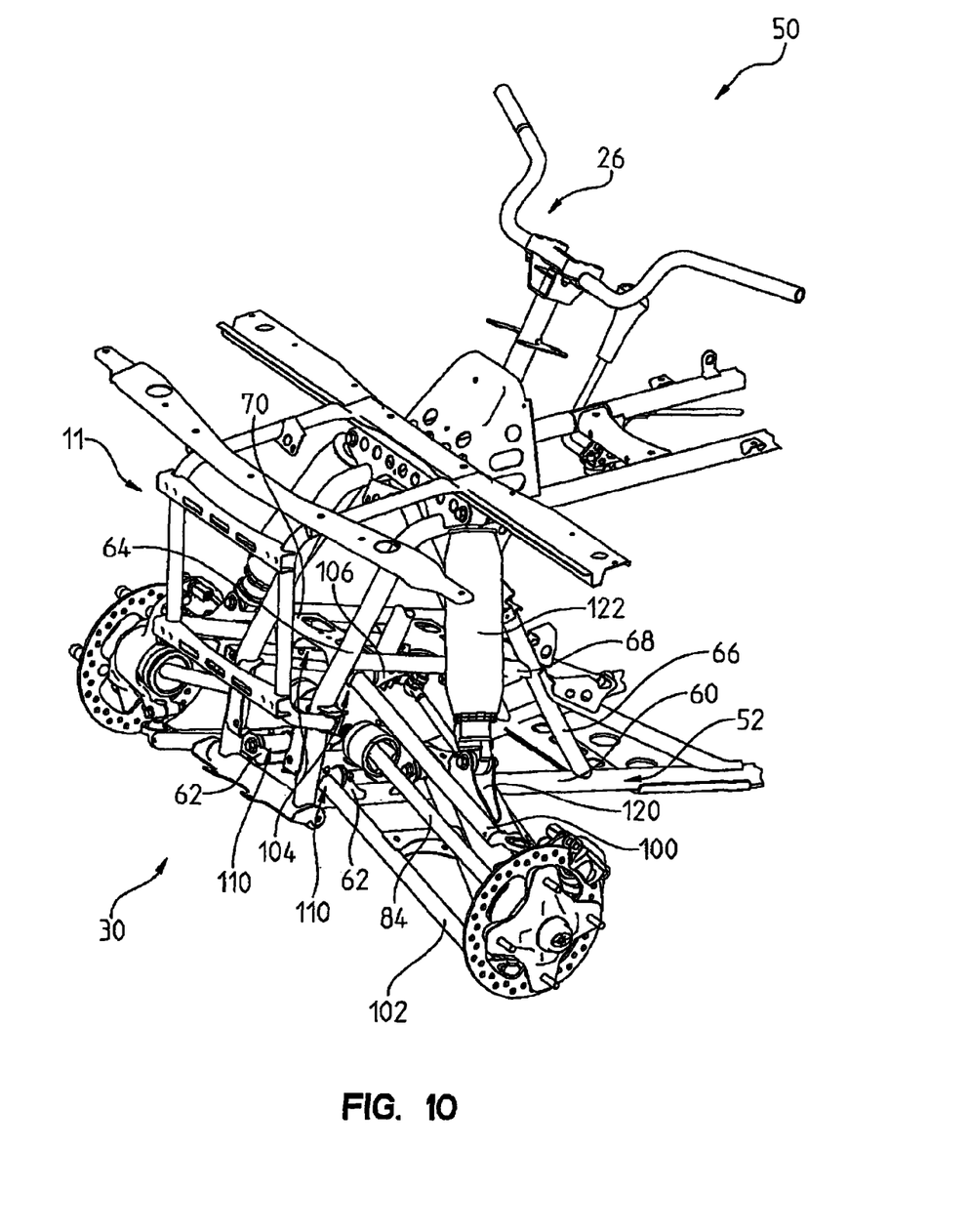
FIG. 10 is a left-hand side perspective view of the suspension assembly, without the power steering assembly in place.

Referring now to FIG. 10, front end 11 and front suspension 30 of ATV 10 are shown. Front suspension 30 includes upper and lower control arms, illustratively A-arms 100 and 102, on each side of ATV 10. Upper A-arms 100 are coupled on one end at upper inner pivot couplings 104 to bracket portion 106 of bracket 70. Lower A arms 102 are coupled on one end at lower inner pivot couplings 110 to brackets 62 of front portion 52 of frame 50. Upper A arms 100 also include brackets 120 which are coupled to shock absorbers 122. Shock absorbers 122 dampen the upward and downward travel of frame 50 relative to wheels 12, to provide a comfortable ride to the rider of ATV 10.

Front axles or half shafts 84 extend from front differential 80 to drive the front wheels of ATV 10. Each half shaft 84 is operably coupled to a wheel 12. In this illustrative embodiment, ATV 10 is four-wheel drive. As such, front axles 84 are rotated by front differential 80 to power front wheels 12, and rear axles 86 are rotated by rear differential 78 to power rear wheels 16.

Front suspension 30 and rear suspension 210 may include certain elements of the Predator™ brand ATV and the Outlaw™ brand ATV, both available from Polaris Industries, the assignee of the present disclosure. Details of the Predator™ brand ATV suspension are disclosed in U.S. Pat. No. 6,767,022, U.S. Pat. No. 7,000,931, and U.S. Pat. No. 7,004,484, the disclosures of which are expressly incorporated by reference herein. Details of the Outlaw™ brand ATV suspension are disclosed in U.S. patent application Ser. No. 11/528,889, filed Sep. 27, 2006, and U.S. patent application Ser. No. 11/543,430, filed Oct. 5, 2006, both of which claim the benefit of U.S. Ser. No. 60/813,597, filed Feb. 1, 2006, the disclosures of which are expressly incorporated by reference herein.

Figure 11:
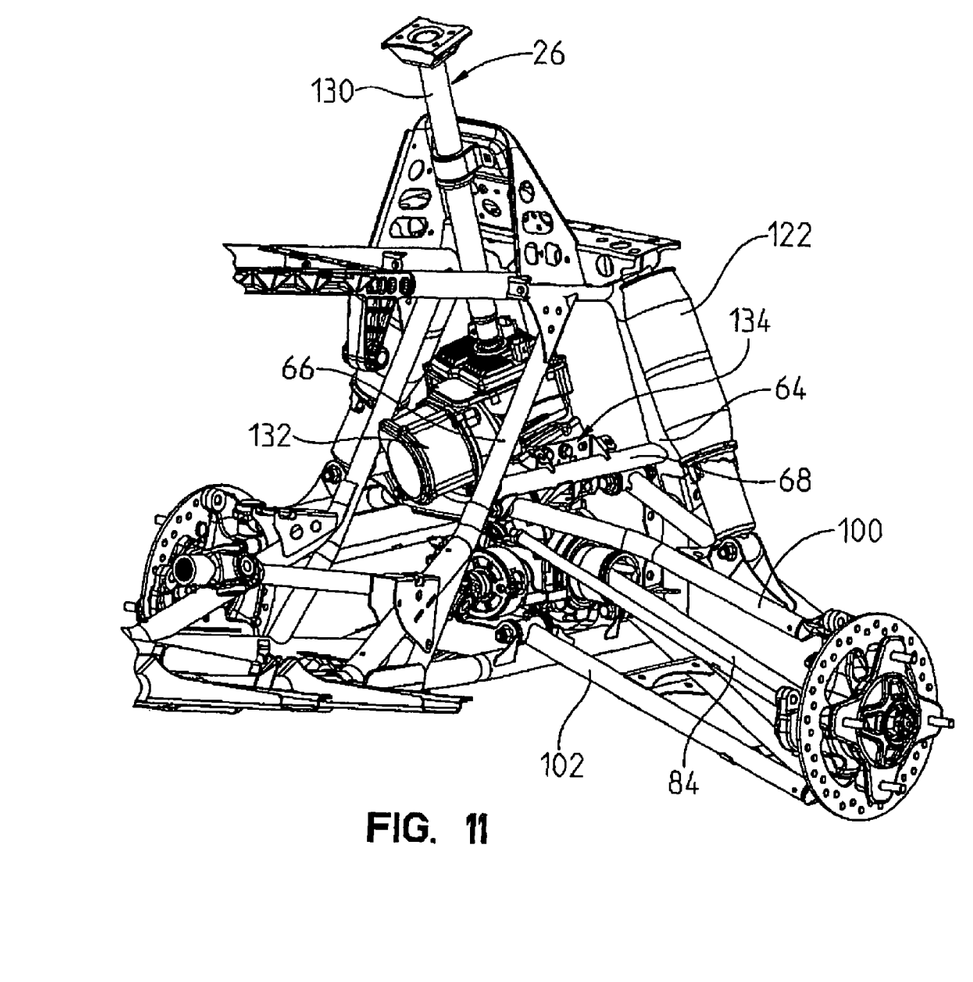
FIG. 11 is a right-hand side perspective view of the power steering assembly which may be incorporated into the frame of FIG. 10.
Figure 12:
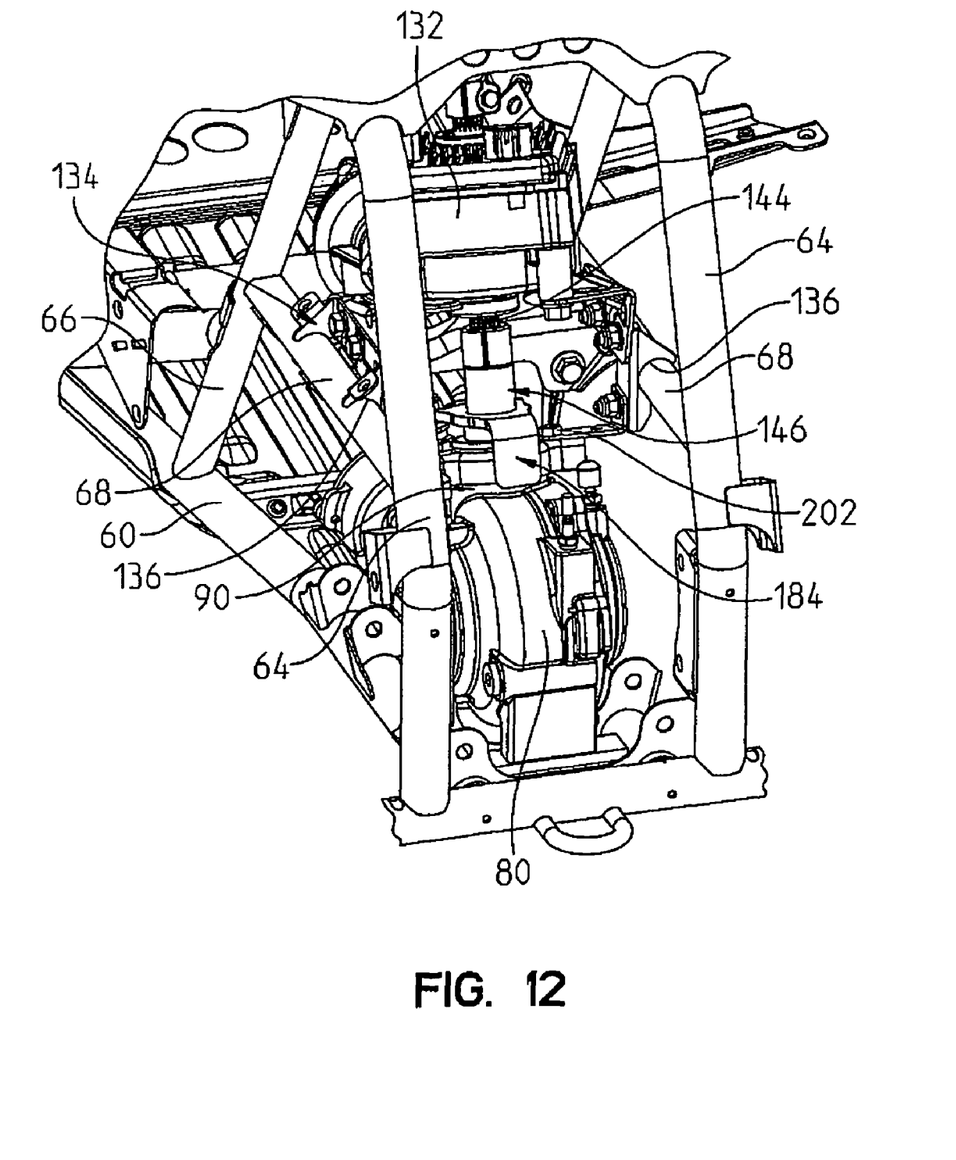
FIG. 12 is a front perspective view of the power steering assembly of FIG. 11.

With respect now to FIGS. 11-13, the power steering assembly 26 will be described in greater detail. Steering assembly 26 is comprised of an upper steering shaft 130 attached to a power steering unit 132. Power steering unit 132 is attached by way of a bracket assembly 134 to connecting tubes 68. Brackets could be connected by any known means, but it is anticipated that brackets 134 are welded to tubes 68 at joints 136 (FIG. 12). As shown best in FIG. 13, power steering assembly 132 is comprised of an electric motor 140 and a gear box 142 where steering shaft 130 is splined to an upper spline 143 and a lower spline 144 of gear box 142 is connected to a lower steering linkage assembly 146. Lower steering linkage 146 is attached to bracket assembly 134 by way of a further interconnecting bracket 148.

Figure 13:
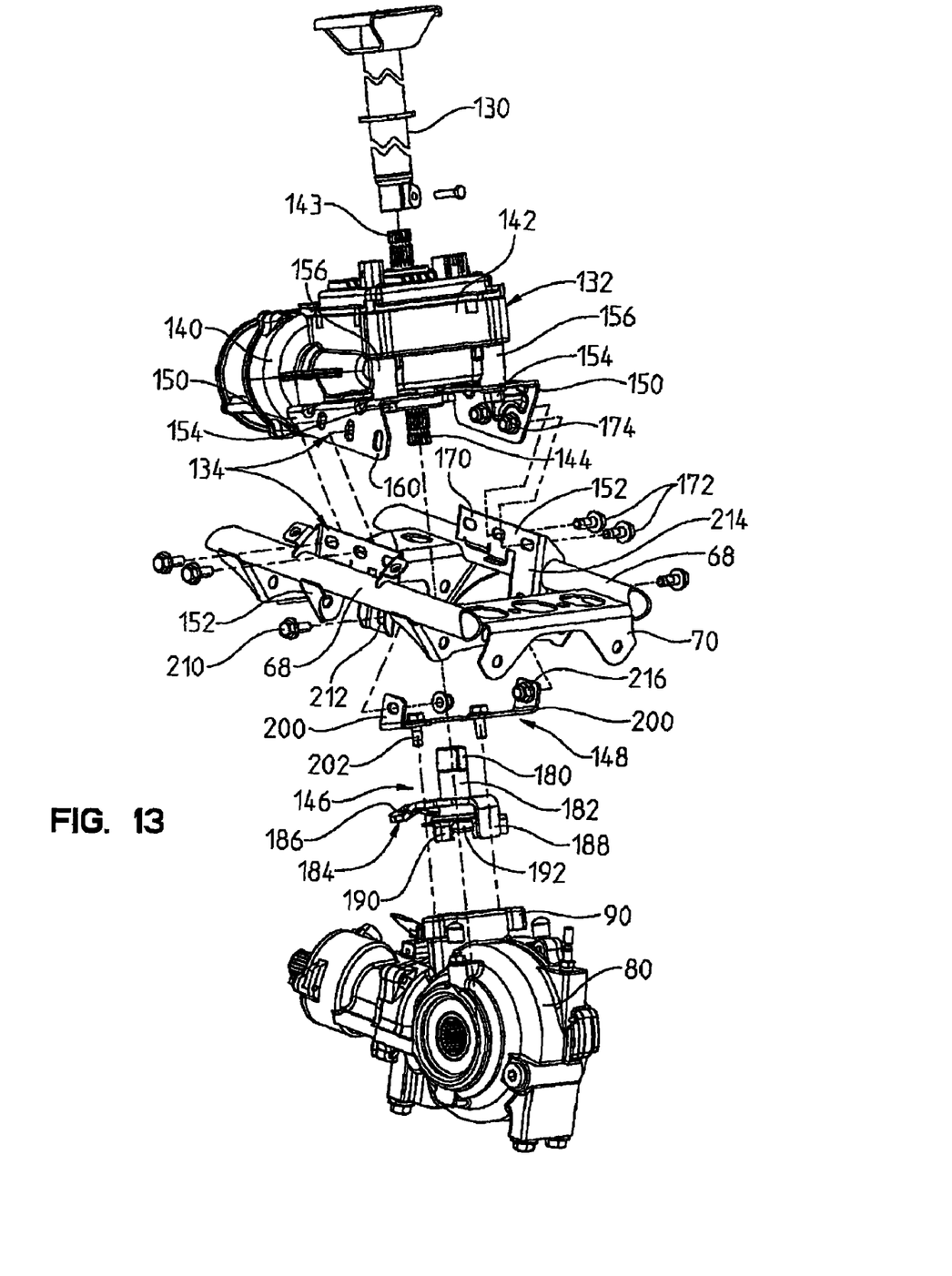
FIG. 13 is a partially exploded front perspective view of the power steering assembly of FIGS. 11 and 12.

With more particularity, and with reference to FIGS. 12 and 13, bracket assembly 134 is comprised of upper bracket portions 150 and lower bracket portions 152. Upper bracket portions 150 are attached to gear box 142 by way of fasteners 154 which extend through threaded bosses 156 on gear box 142. Each upper bracket portion 150 includes a plate portion 160 for mounting adjacent to lower bracket portions 152. Meanwhile lower bracket portions 152 include plate portions 170 which receive therethrough fasteners 172 which couple with fasteners 174. As should be appreciated, coupling fasteners 172 through plate portion 170 and plate portion 160 to fasteners 174 rigidly fixes gear box 142 and motor 140 to the frame tubes 68, just above tubes 68. This positions the power steering assembly generally above the tubes and the upper A-arms 100, with a portion extending below the A-arms 100.

With reference still to FIGS. 12 and 13, lower steering linkage assembly 146 is also rigidified by way of attachment to both the front differential 80 and to frame tubes 68. With reference first to FIG. 13, lower steering linkage assembly 146 is comprised of an upper splined coupler 180 attached to a stub shaft 182. Stub shaft 182 is rigidly fixed to rotatable coupler 184 which is comprised of Pitman arm 186 and a stop member 188 which rotates clockwise and counterclockwise between extreme positions. Assembly 146 also includes a bearing cap 190 which is profiled to be received over flange 90 of front differential 80. Bearing cap 190 is contoured with the shape of flange 90 (see FIGS. 9 and 13) and bearing cap 190 is fixed relative to flange 90 during operation of the power steering unit as further described herein. The free end of stub shaft 182 is provided with a bearing 192 which rotates with stub shaft 182 and is profiled to be received within aperture 92 (see FIG. 9) at the top of the front differential 80 within a bearing sleeve (not shown).

Lower steering assembly 146 is also attached to the front differential 80 and to the lower brackets 170 of bracket assembly 134 by way of interconnecting bracket 148. Interconnecting bracket 148 includes L-shaped bracket members 200 with fasteners 202 extending through bearing cap 190 and into apertures 94 (FIG. 9) on the top front differential 80 as best shown in FIGS. 12 and 13. Meanwhile fasteners 210 extend through an aperture 212 of lower arms 214 (which extend from lower brackets 170) which in turn correspond with fasteners 216. As mounted, power steering unit is held in the vertical sense and later sense by bearing 192 in aperture 92; and in a lateral sense by bracket assembly 148 attached to bracket assembly 134.

While multiple power steering units are possible, as defined herein, the unit is provided by Globe Industries, and preferably has an output torque greater that 50 N-M, and more preferably approximately 50 N-M.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A four wheel drive all-terrain vehicle, comprising:
   a frame including longitudinally spaced-apart ends defining a first longitudinal axis, the frame comprising a frame front end portion;
   a plurality of wheels operably coupled to the frame;
   a steering linkage operatively coupled between an operator input steering portion and at least one of the plurality of wheels, the steering linkage comprising a lower steering assembly having a rotatable coupler and a fixed portion front and rear differentials; and
   a power steering assembly operatively coupled to the steering linkage, the power steering assembly comprising an electric motor and a gear box, the gear box comprising an input shaft and an output shaft, the input shaft being operatively coupled to the operator input steering portion, wherein, the rotatable coupler comprising a shaft which is supported at its free end, a bearing is positioned at the free end of the rotatable coupler shaft and the bearing is held within an aperture by the fixed portion of the lower steering assembly and the rotatable coupler shaft rotates relative to the bearing; and the aperture is integrated within the front differential housing.

2. The all-terrain vehicle of claim 1, wherein the aperture is located at the top of the front differential housing.

3. The all-terrain vehicle of claim 1, wherein the lower steering assembly further comprises a bearing cap which at least partially surrounds the bearing, and is fixed to the top of the front differential housing.

4. The all-terrain vehicle of claim 3, wherein a Pitman arm is attached to the rotatable coupler shaft, above the bearing cap.

5. The all-terrain vehicle of claim 4, wherein the top of the front differential is provided with a flange, profiled to receive the bearing and the bearing cap.

6. The all-terrain vehicle of claim 1, further comprising a first bracket assembly for attaching the power steering assembly to the frame.

7. The all-terrain vehicle of claim 6, wherein the lower steering assembly further comprises a bearing cap, and a second bracket assembly attached to the bearing cap and to the first bracket assembly, laterally supporting the output shaft.

8. A four wheel drive all-terrain vehicle, comprising:
a frame including longitudinally spaced-apart ends defining a first longitudinal axis, the frame comprising a frame front end portion;
a plurality of wheels operably coupled to the frame;
front and rear differentials;
a steering linkage operatively coupled between an operator input steering portion and at least one of the plurality of wheels, the steering linkage comprising a lower steering assembly having a rotatable coupler and a fixed portion;
a power steering assembly operatively coupled to the steering linkage, the power steering assembly comprising an electric motor and a gear box, the gear box comprising an input shaft and an output shaft, the input shaft being operatively coupled to the operator input steering portion, and the output shaft being operatively coupled to the lower steering assembly, the lower steering assembly having a bearing adjacent its free end; and
a bearing support flange supporting the output shaft bearing, the bearing support flange being provided on the front differential housing.

9. The all-terrain vehicle of claim 8, wherein the rotatable coupler is comprised of a shaft which is supported at its free end.

10. The all-terrain vehicle of claim 9, wherein the bearing is attached to the free end of the rotatable coupler shaft, and the bearing is held by the bearing support flange, and the rotatable coupler shaft rotates relative to the bearing.

11. The all-terrain vehicle of claim 10, wherein the bearing support flange comprises an aperture and the bearing and the rotatable coupler shaft are held fixed within the aperture.

12. The all-terrain vehicle of claim 11, wherein the aperture is located at the top of the front differential housing.

13. The all-terrain vehicle of claim 12, wherein the support assembly further comprises a bearing cap which at least partially surrounds the bearing, and is fixed to the bearing support flange.

14. The all-terrain vehicle of claim 8, wherein the rotatable coupler shaft is supported both vertically and laterally.

15. The all-terrain vehicle of claim 8, wherein the output torque on the rotatable coupler shaft is at least 50 N-M.

16. The all-terrain vehicle of claim 15, wherein the output torque on the rotatable coupler shaft is approximately 60 N-M.

* * * * *